(12) United States Patent
Nada et al.

(10) Patent No.: US 6,305,608 B1
(45) Date of Patent: Oct. 23, 2001

(54) PEN TYPE CODE READER

(75) Inventors: Yoshiyuki Nada; Chikayoshi Meguro, both of Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/141,429

(22) Filed: Aug. 27, 1998

(30) Foreign Application Priority Data

Jun. 4, 1998 (JP) .................................................. 10-155703

(51) Int. Cl.$^7$ ...................................................... G06K 7/10
(52) U.S. Cl. ................................. 235/472.03; 235/462.45
(58) Field of Search .......................... 235/472.01, 472.03, 235/462.01, 462.1, 462.45, 462.49; 434/312; 283/494, 456

(56) References Cited

U.S. PATENT DOCUMENTS

| | | | |
|---|---|---|---|
| D. 396,463 | * | 7/1998 | Nada et al. ........................... D14/116 |
| D. 419,547 | * | 1/2000 | Nada et al. ........................... D14/116 |
| 3,541,248 | * | 11/1970 | Young ..................................... 178/6.6 |
| 3,918,028 | * | 11/1975 | Humphrey et al. ............. 340/146.3 F |
| 4,240,748 | * | 12/1980 | Blanc et al. ........................... 356/138 |
| 4,251,800 | * | 2/1981 | Sanner et al. ............... 340/146.3 SY |
| 4,553,035 | * | 11/1985 | Malinsky et al. .................... 250/566 |
| 4,793,812 | * | 12/1988 | Sussman et al. ...................... 424/116 |
| 4,804,949 | * | 2/1989 | Faulkerson ........................... 340/710 |
| 5,012,349 | * | 4/1991 | De Fay ................................. 358/296 |
| 5,231,293 | * | 7/1993 | Longacre, Jr. ....................... 250/568 |
| 5,256,866 | * | 10/1993 | Conversano et al. ................ 235/472 |
| 5,428,212 | * | 6/1995 | Tani et al. ............................. 235/472 |
| 5,481,101 | * | 1/1996 | Yoshida ................................ 235/472 |
| 5,602,379 | * | 2/1997 | Uchimura et al. ................... 235/472 |
| 5,656,803 | * | 8/1997 | Seo ....................................... 235/472 |
| 5,852,288 | * | 12/1998 | Nakazawa et al. .................. 235/472 |
| 5,860,679 | * | 1/1999 | Fakuda et al. ......................... 283/70 |
| 5,874,718 | * | 2/1999 | Matsui .................................. 235/494 |
| 5,936,228 | * | 8/1999 | Yoshihara ............................. 235/494 |

FOREIGN PATENT DOCUMENTS 0 670 555 A1   9/1995 (EP) .
1-30186        6/1989 (JP) .

* cited by examiner

Primary Examiner—Karl D. Frech
Assistant Examiner—Daniel St. Cyr
(74) Attorney, Agent, or Firm—Frishauf, Holtz, Goodman, Langer & Chick, P.C.

(57) ABSTRACT

A pen type code reader is provided with two pairs of substantially parallel anti-tilt ridges arranged on the respective opposite external sides of the front section of the code reader main body to be located along the scanning direction and projecting in the scanning direction. The code reader further includes a groove arranged on the front surface of the front section of the code reader main body and open at the opposite ends to the external sides in the scanning direction and having a width substantially equal to the width of the code pattern.

12 Claims, 6 Drawing Sheets

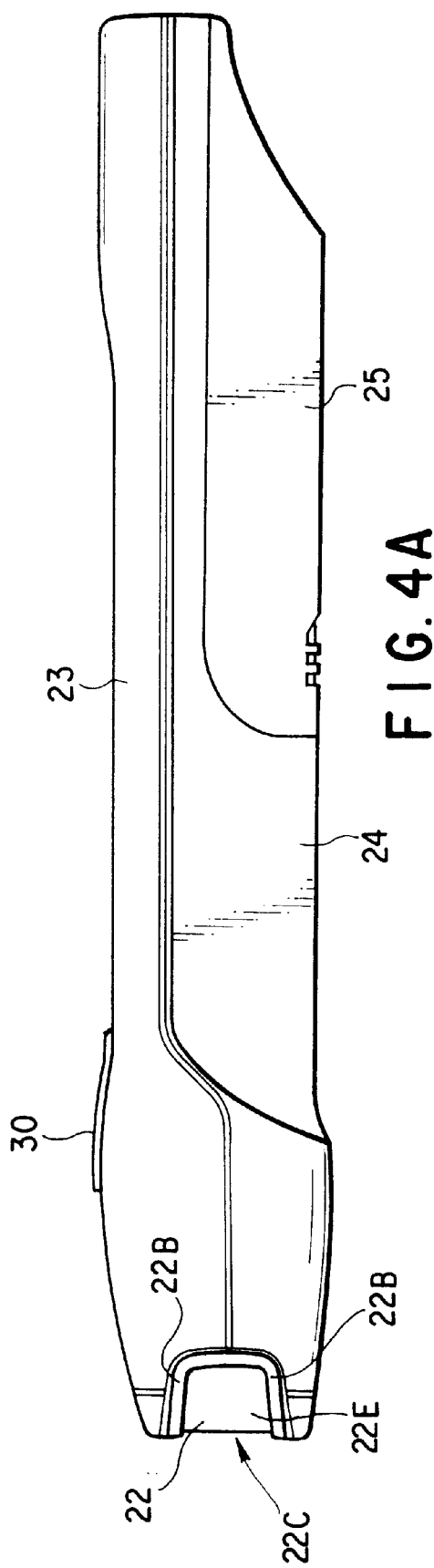
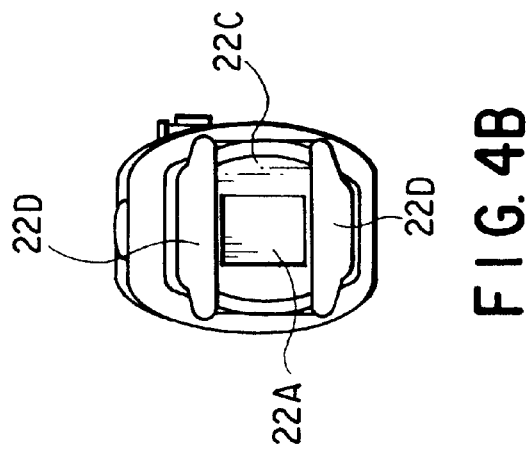
FIG. 4A
FIG. 4B

PEN TYPE CODE READER

BACKGROUND OF THE INVENTION

This invention relates to an improvement to a pen type code reader adapted to manually scan a sheet of recording medium such as paper and optically read the code pattern printed thereon and representing sounds, images and/or data to be processed by a computer.

Pen type code readers adapted to manually scan a sheet of recording medium such as paper and optically read the code pattern printed thereon and representing data are already known. For example, EP 0,670,555 A1 discloses a pen type code reader comprising an area sensor such as a CCD that transforms the light received from a focused image formed by an optical system into an electric signal and adapted to manually scan a sheet of recording medium such as paper, keeping its front surface having an image pick-up opening constantly in contact with the sheet of recording medium and optically read the code pattern printed thereon.

FIG. 1 of the accompanying drawings shows an exemplary code pattern that can be used with a pen type code reader of type under consideration, illustrating the physical format of dot code 1.

Referring to FIG. 1, the dot code 1, which can represent a sound data, is realized in the form of a plurality of rectangular blocks 2 arranged two-dimensionally side by side on a recording medium, each of the blocks 2 comprising a data dot pattern section 3 showing a dot image formed by white dots and black dots representing respective data values of "0s" and "1s", markers 4 arranged at the four corners of the block as reference points for locating each of the dots of the data dot pattern section 3, each of the markers 4 being formed by a certain number of consecutively arranged black dots, and a block address pattern section 5 arranged between adjacently located markers 4 to make the block 2 discriminable from other blocks 2 and including an error detecting or error correcting code.

Note that reference numeral 5A in FIG. 1 denotes the address of the block. Also note that, in the enlarged view of block 2 located in the middle of FIG. 1, the matrix of lines and the frame are shown only for the ease of understanding and do not exist in reality.

FIG. 2 of the accompanying drawings shows a schematic block diagram of the electrically functional components of a code reader adapted to optically read such a dot code 1.

Referring to FIG. 2, the code reader comprises at least an image pick-up section 6, a binarization processing section 7, a binarized image memory 8, a data restoring section 9, a demodulator section 10, and a reproducing section 11. The image pick-up section 6 includes a lighting section typically constituted by an LED, an optical system for focusing the light reflected from the dot code 1 and an area sensor, which may be a CCD, for picking up the light focused by the optical system. The binarization processing section 7 carries out a processing operation of binarizing the image pick-up signal output from the image pick-up section 6 by means of a predetermined binarization threshold value. The binarized image memory 8 stores binarized image data produced from the binarization processing section 7. The data restoring section 9 reads the binarized image data stored in the binarized image memory 8, detects the dots of the dot code and assigns "0" or "1" to each of the detected dots to restore and output the data. The demodulator section 10 demodulates the data output from the restoring section 9. The reproducing section 11 reproduces the original data, which can be sound data, after processing the output of the demodulator section 10 for error correction and data expansion.

The image pick-up section 6 of the code reader is moved on the dot code 1 in the direction indicated by the arrow in FIG. 1 to pick-up the image of the dot code on a section by section basis so that the code reader can read the dot code 1 if the latter is greater than the viewing field 6A of the image pick-up section 6.

In other words, the original data can be restored from the data sections of the blocks 2 even if the dot code 1 cannot be picked up by the code reader in a single shot, provided that the address of each of the blocks 2 is correctly recognized by the code reader. Thus, consequently, a large volume of information, which can be sound information, can be stored highly densely on and transmitted by a sheet of paper to such an extent that cannot be realized by any conventional one-dimensionally or two-dimensionally arranged bar codes. Such a dot code system may find a variety of applications.

When reading the data stored in the binarized image data from the binarized image memory 8 and detecting the dots, the restoring section 9 firstly detects the markers 4 in the binarized image data and determines a reference point for reading the dots on the basis of the centroid of each of the detected markers 4. Then, it detects the central pixel of each dot in the data dot pattern section 3 by referring to the reference point for reading the dots and determines if the detected dot is a white dot or black dot so that either "0" or "1" is assigned to the detected dot.

Thus, if the highly densely printed dot code is geometrically distorted to make it defective to some extent, it may be read properly and appropriately and the original data can be restored reliably.

The recorded original data, which can be sound data, is modulated when it is transformed into a dot code 1. The demodulator section 10 is provided to demodulate the modulated data.

The original data is modulated such that the restoring section 9 can easily detect the markers to begin its operation. More specifically, the largest possible number of consecutive black dots in the dot code pattern section is made smaller than the number of consecutive black dots of each marker 4 for the input sound data so that the image of each of the dots in the data dot pattern section 3 may be discriminated from that of each of the markers 4.

If the largest diameter of a marker 4 is equal to the length of five black dots printed in the data dot pattern section 3 and arranged on a line along a given direction, the above modulating operation will be such that the number of consecutive black dots in the modulated data is made smaller than five.

However, while a pen type code reader as disclosed in EP 0,670,500 A1 is portable and can be handled conveniently for reading a code pattern, the code reader main body 12 of the pen type code reader is apt to be tilted toward the scanning direction, or the longitudinal direction of the code pattern 13 (as indicated by the arrow in FIG. 3), during a manual scanning operation so that the front end of code reader main body having the image pick-up opening is lifted from the contact surface and the code pattern 13 is put out of focus. Then, it is no longer possible to accurately pick up the image of the code pattern 13 to consequently give rise to read errors for the dot code.

Additionally, a pen type code reader of the type under consideration requires an arrangement that makes the front end of the code reader main body to be easily aligned with the code pattern and protects the code pattern against damages and stains that can be produced when it is brought into contact with the front end of the code reader main body.

BRIEF SUMMARY OF THE INVENTION

In view of the above circumstances, it is therefore the object of the present invention to provide a pen type code reader that is made free from the above identified problems by arranging means for preventing the code reader from being tilted toward the scanning direction, protecting it against read errors and facilitating it to be aligned with the code pattern when it is manually operated to scan the code pattern. Such a code reader can also minimize damages and stains that can be produced on the code pattern when it is brought into contact with the front end of the code reader main body.

According to a first aspect of the present invention, there is provided a pen type code reader having an optical system and an area sensor for transforming the light focused by the optical system into an electric signal and outputting the latter and adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

a first groove arranged on the front surface of a front section of a code reader main body and open at the opposite ends in a scanning direction; and second grooves arranged longitudinally on the respective opposite external sides of the front section of the code reader main body to be located along the scanning direction; wherein the first groove and the second grooves are formed as parts of a continuous groove.

According to a second aspect of the present invention, there is provided a pen type code reader having an optical system and an area sensor for transforming the light focused by the optical system into an electric signal and outputting the latter and adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

two pairs of substantially parallel anti-tilt ridges arranged on the respective opposite external sides of a front section of a code reader main body to be located along a scanning direction and projecting in the scanning direction, the gap separating the two anti-tilt ridges of each pair being substantially equal to the width of the code pattern, the width of the code pattern extending perpendicularly relative to the scanning direction; and a groove arranged on the front surface of the front section of the code reader main body and open at the opposite ends to the external sides in the scanning direction and having a width substantially equal to the width of the code pattern.

According to a third aspect of the present invention, there is provided a pen type code reader adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

an optical system;

an area sensor for transforming the light focused by the optical system into an electric signal and outputting the latter; and a substantially U-shaped groove arranged on a front section of a code reader main body in such a manner that two end portions of the groove are respectively located at two external side surfaces of the front section which are confronted with a scanning direction.

According to a fourth aspect of the present invention, there is provided a pen type code reader adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

an optical system;

an area sensor for transforming the light focused by the optical system into an electric signal and outputting the latter; and two pairs of substantially parallel anti-tilt ridges arranged on the respective opposite external sides of a front section of a code reader main body to be located along a scanning direction and projecting in the scanning direction; wherein the gap separating the two anti-tilt ridges of each pair is substantially equal to the width of the code pattern, the width of the code pattern extending perpendicularly relative to the scanning direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A through 4C are a lateral view, a front view and a cross sectional view of a first embodiment of pen type code reader according to the invention.

DETAILED DESCRIPTION OF THE INVENTION

Now, preferred embodiments of the present invention will be described below by referring to the accompanying drawing.

Figure 4C:
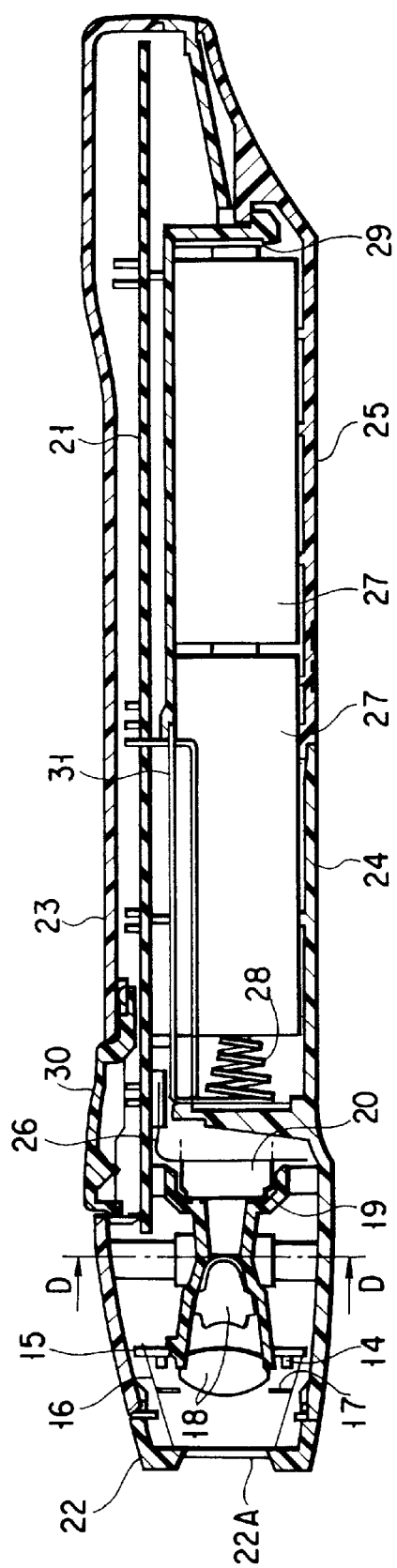
Figure 4D:
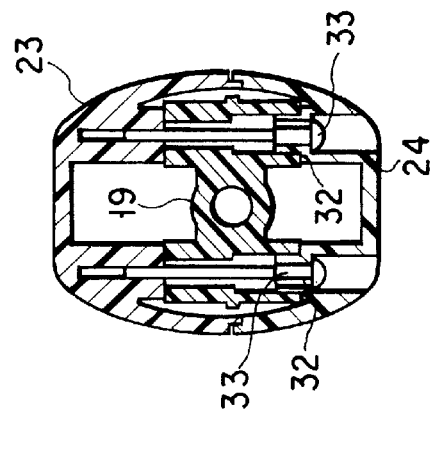
FIG. 4D is a cross sectional view taken along line D—D in FIG. 4C.

FIGS. 4A through 4C are a lateral view, a front view and a cross sectional view of a first embodiment of a pen type code reader according to the invention. FIG. 4D is a cross sectional view taken along line D—D in FIG. 4C.

Figure 2:
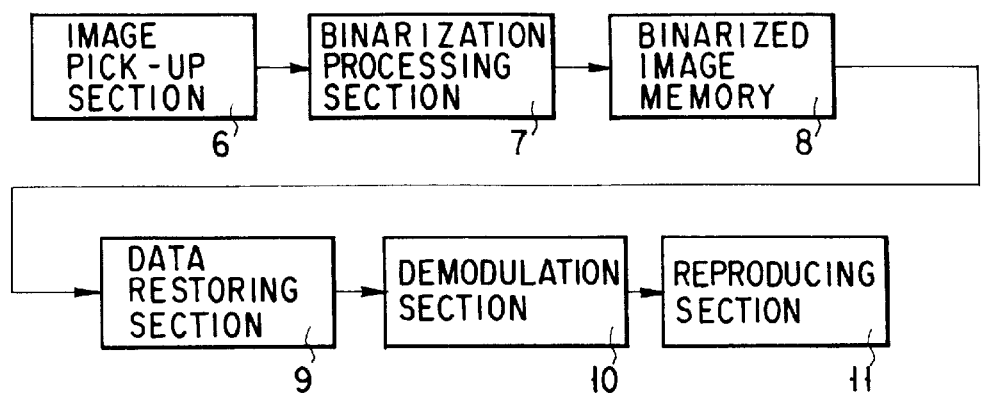
FIG. 2 is a schematic block diagram of the electrically functional components of a conventional code reader.
Figure 3:
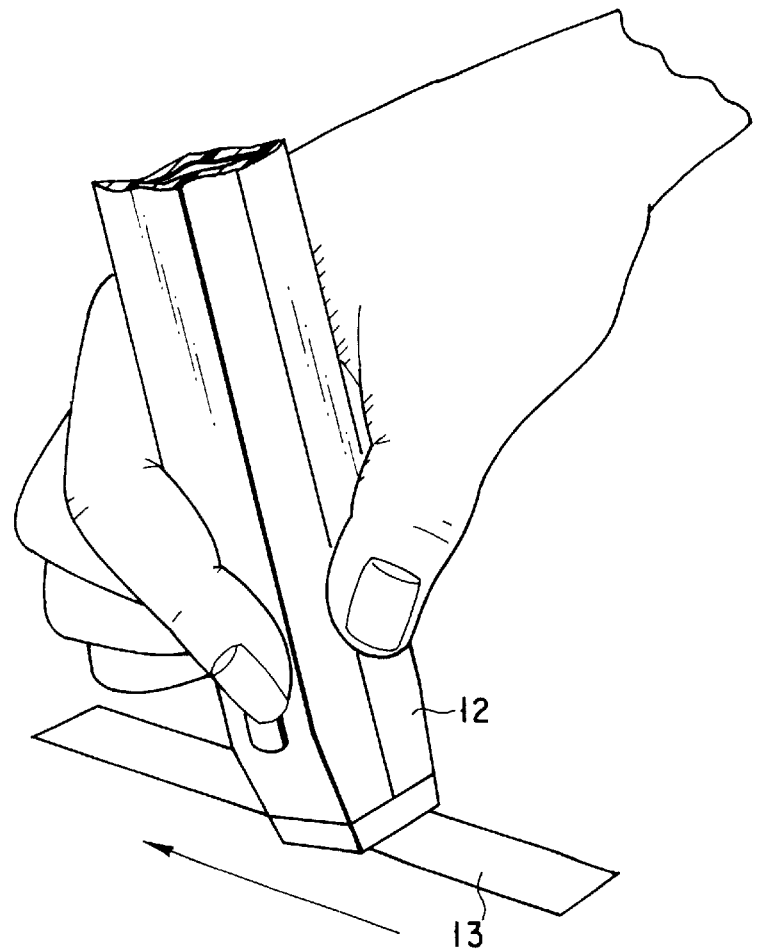
FIG. 3 is a schematic perspective view of a conventional pen type code reader being used to scan a code pattern.

As in the case of the known pen type code reader shown in FIG. 2, the illustrated embodiment of pen type code reader comprises an image pick-up section 6, a binarization processing section 7, a binarized image memory 8, a data restoring section 9, a demodulator section 10 and a reproducing section 11 arranged in a pencil-like cabinet.

The image pick-up section 6 comprises a lighting section for illuminating a code pattern, the lighting section including a light source 14 that may be an LED, a substrate 15 mounted with the light source 14, a light reflecting member 16 typically made of a shining aluminum plate and a light diffusing member 17 typically made of a white sheet; an image pick-up optical section including a lens 18 and a mirror frame 19 for holding the lens 18 and adapted to focus the light reflected from the code pattern on an image pick-up device 20; and the image pick-up device 20 such as a CCD adapted to transfer the light focused by the image pick-up optical section into an electric signal. The remaining components of the pen type code reader, or the processing circuits, all the way from the binarization processing section 7 to the reproducing section 11 are installed on a main substrate 21 and process the image picked up by the image pick-up device 20 to output multimedia data.

The housing for containing the image pick-up section 6 and the components all the way from the binarization processing section 7 to the reproducing section 11 mounted on the main substrate 21 comprises a front section 22 to be held in tight contact with a recording medium carrying thereon a code pattern when scanning the code pattern, an upper cover 23, a lower cover 24 and a battery chamber lid 25.

In FIG. 4C, there are also shown a connection cable 26 for connecting the image pick-up device 20 and the processing circuits installed on the main substrate 21, batteries 27 operating as drive power source, a negative terminal 28 and a positive terminal 29 used for the batteries and an operation switch 30 to be used by the user to start a read operation.

In FIG. 4C, a electrically conductive shield panel 31 which is typically a metal plate is provided as part of the negative side of the battery chamber wall and electrically connected to the negative terminal 28 and the ground terminal of the main substrate 21 in order to block the radiation of electric waves that can adversely affect other electric apparatus that may be found near the code reader.

The light reflecting member 16 of the lighting section is arranged to reflect and converge light emitted from the light source 14 on the code pattern, whereas the light diffusing member 17 diffuses light emitted from the light source 14 so that the code pattern may be evenly illuminated.

For example, as shown in FIG. 4D, the image pick-up optical section is placed in position as aligning members 32 arranged on the lower cover 24 are received in respective holes of the mirror frame 19 and pinched by the upper cover 23 and the lower cover 24, which are then held relative to each other by means of screws 33. As a result, the optical axis of the image pick-up optical system is securely prevented from misalignment relative to the opening 22A despite the simple configuration of the embodiment.

Figure 5:
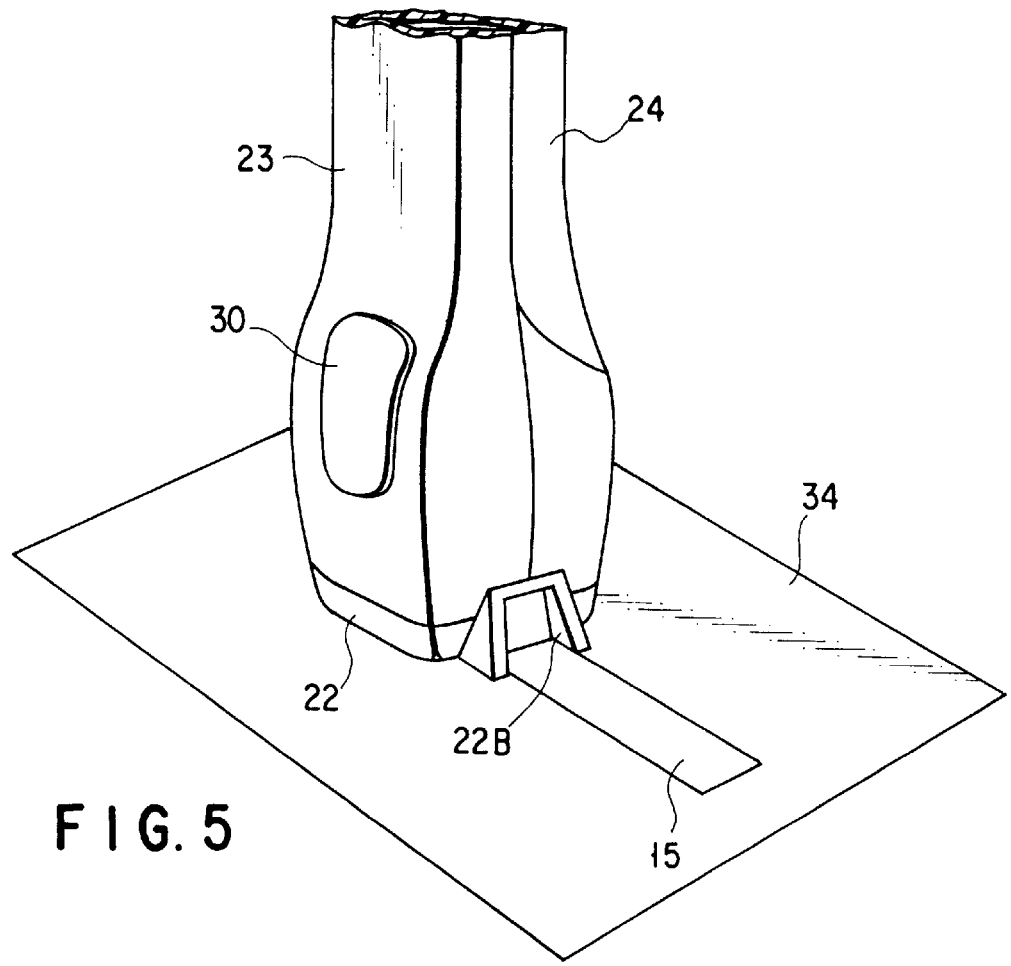
FIG. 5 is a schematic perspective view of the embodiment of pen type code reader of FIG. 4A being used to scan a code pattern.

FIG. 5 is a schematic perspective view of the embodiment of pen type code reader of FIG. 4A being used to scan a code pattern.

Referring to FIGS. 5, 4A and 4B, the front section 22 of the code reader that is held in contact with a code pattern 13 when manually scanning the latter is provided on each of the pair of opposite sides to be located along the scanning direction with a pair of anti-tilt ridges 22B projecting in the scanning direction.

With the provision of the anti-tilt ridges 22B, the code reader is prevented from tilting toward the scanning direction during the scanning operation of the code pattern so that the risk of putting the code pattern out of focus and giving rise to read errors can be minimized.

If the distance separating the pair of anti-tilt ridges 22B is made equal to the width of the code pattern, they may operate as guides members for guiding the user to correctly move the code reader on the code pattern for the scanning operation. If, on the other hand, the distance separating the pair of anti-tilt ridges 22B is sufficiently greater than the width of the code pattern, the user may easily move the code reader on the code pattern for the scanning operation. In this embodiment, the image pick-up device 20 is made to cover an area having a width sufficiently greater than that of the code pattern 13 in order to accommodate a swinging motion of the code reader to a certain extent so that the user may move the code reader on the code pattern with ease for the scanning operation. The phrase "sufficiently greater than the width of the code pattern" as used herein refers to a condition where the image pick-up device 20 can pick up the code pattern with a reasonable margin.

Figure 1:
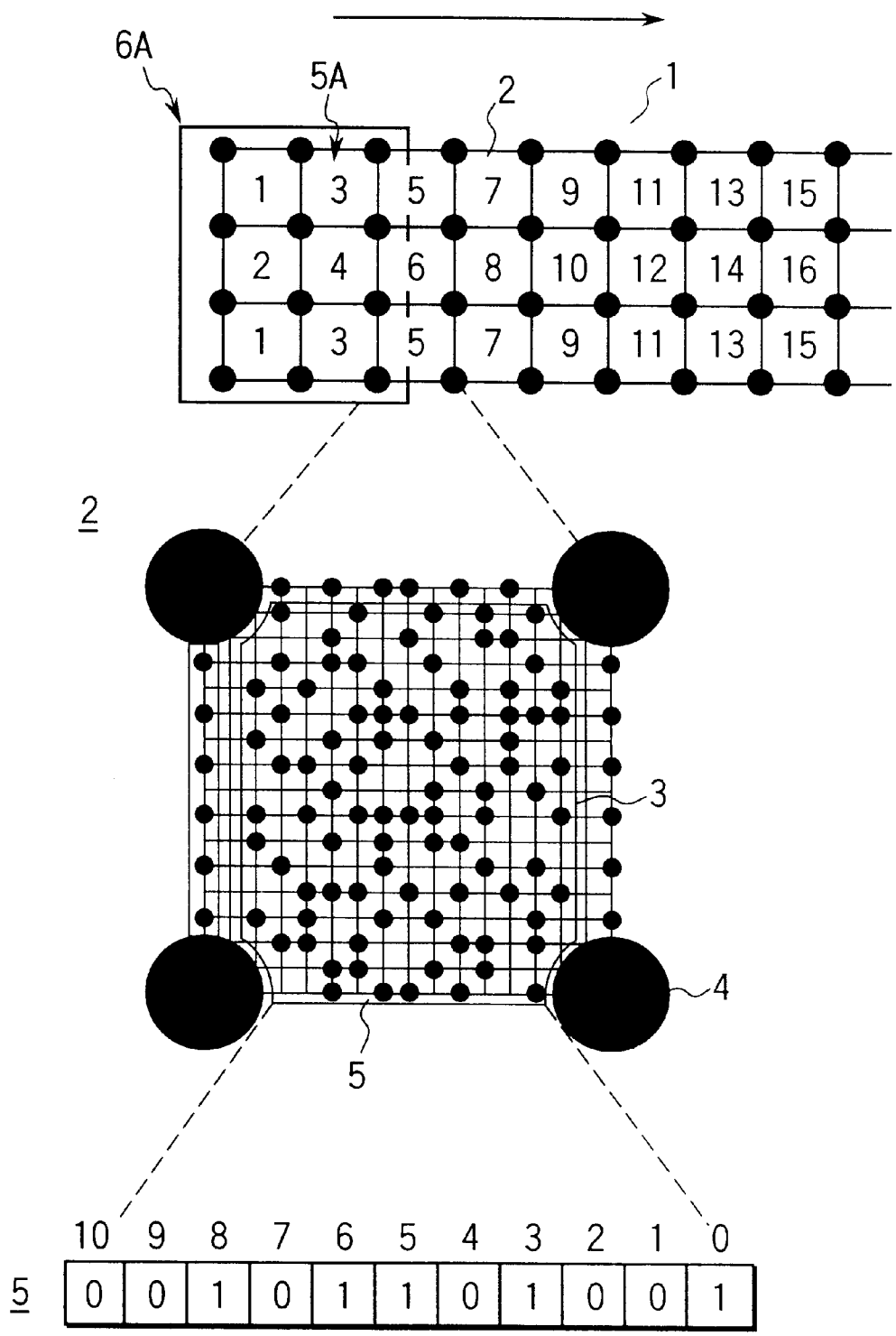
FIG. 1 is a schematic illustration of the physical format of a dot code pattern that can be used for the purpose of the invention.

Referring to FIG. 4B, the front section 22 of the code reader is provided with a groove 22C on the side to be held in contact with the recording medium 34 where the opening 22A is located to pick up an image of the code pattern, the groove 22C running in the scanning direction and having a width corresponding to that of the code pattern 13 to be read. With this arrangement, only the contact surfaces 22D of the front section is made to contact with the recording medium 34 to minimize the contact area of the code reader and the recording medium 34 and hence the possibility of damaging the code pattern 13 during the scanning operation. Note that the groove 22C has a width substantially equal to the width of the code pattern 13. The width of the code pattern is defined by the number of vertically arranged blocks 2 in the code pattern 13 if the code pattern 13 corresponds to a dot code 1 comprising a plurality of rectangular blocks 2 arranged side by side, each containing a data portion having a predetermined volume and obtained by dividing the original data. In the instance of the dot code 1 shown in FIG. 1, the width of the code pattern is equal to three times of the width of a block 2.

The front section 22 is made of a material having a small coefficient of friction (e.g., polyacetal, nylon, etc.) and different from the material of the housing such as polycarbonate, polystyrene or ABS so that the code reader may slide smoothly on the recording medium with a minimal damage on the part of the code pattern 13.

Figure 6:
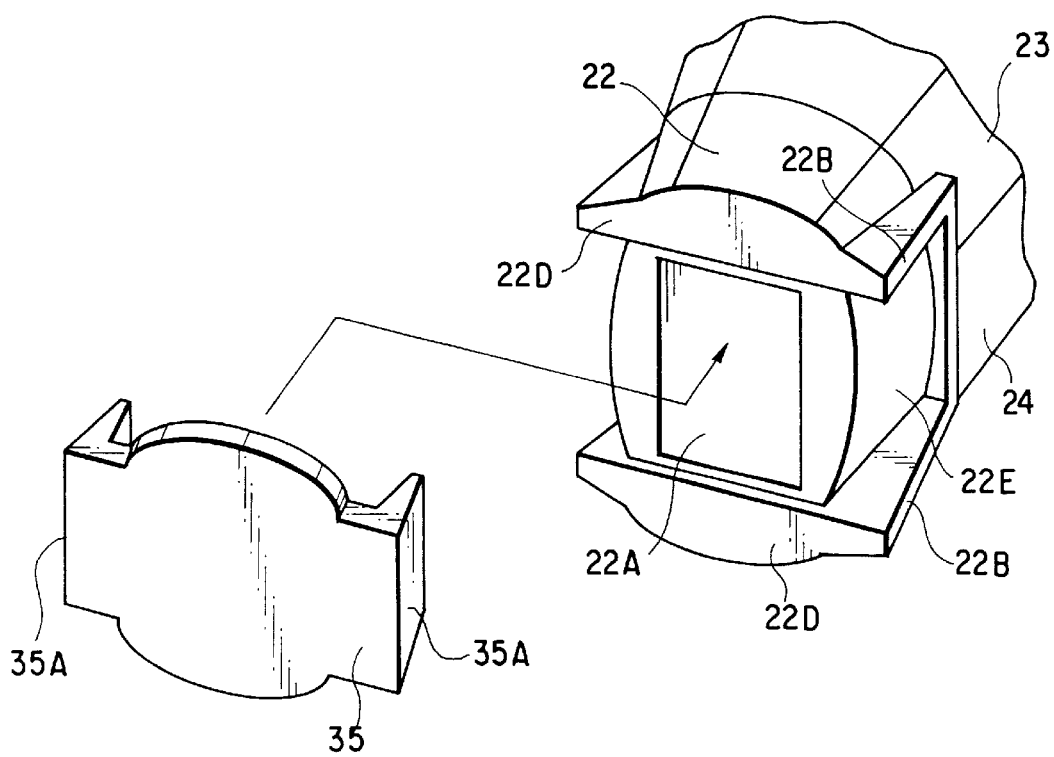
FIG. 6 is a schematic perspective view of the cap of the pen type code reader shown in 4A.

The code reader may be provided with a cap 35 as shown in FIG. 6. The cap 35 shields the opening 22A and prevents pieces of dirt from adhering to the lens 18 when the code reader is not in use and the cap 35 is fitted to the code reader. It may not necessary to describe how the cap 35 is held in position on the code reader.

The cap 35 has engaging sections 35A to be fitted respectively to the gaps 22E between the pairs of anti-tilt ridges 22B arranged on the opposite sides to be located along the scanning direction. Thus, the cap 35 fills the gaps 22E between the pairs of anti-tilt ridges 22B and protects the anti-tilt ridges 22B. Differently stated, the anti-tilt ridges 22B cannot have a significantly large height from the point of view of the performance of the code reader and that of the appearance of the anti-tilt ridges 22B and hence the anti-tilt ridges 22B that are fillets of a sort can be damaged when subjected to external impact. The anti-tilt ridges 22B are protected against deformations due to external force by the engaging sections 35A. Note that the cap 35 can be easily fitted to the code reader when the opening 22A of the latter is provided with a fitting element (not shown).

Now, a second embodiment of the invention will be described.

Figure 7:
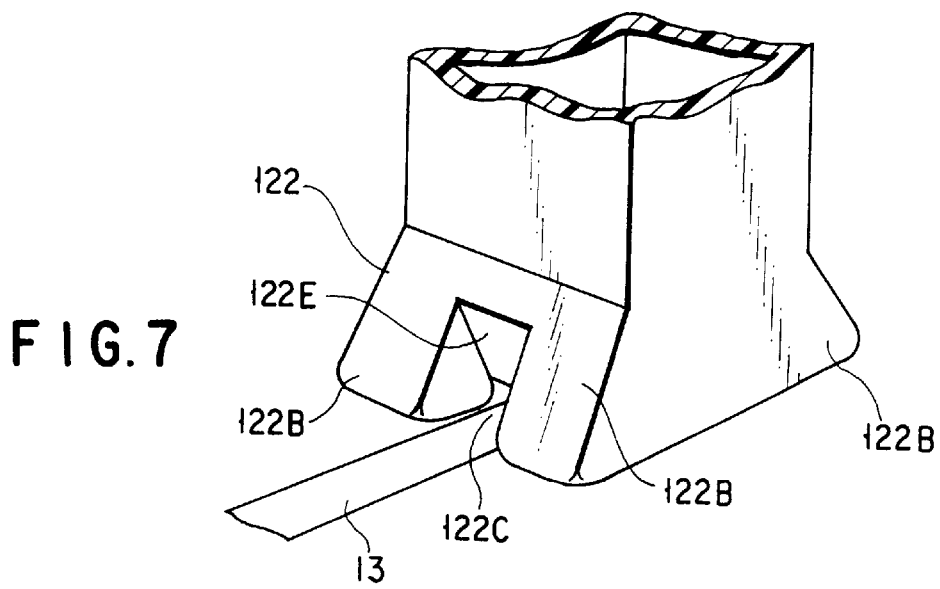
FIG. 7 is a schematic perspective view of a front section of a second embodiment of pen type code reader according to the invention, showing its outer profile.

The front end 22 may be made to show a profile as shown in FIG. 7, which is different from that of FIGS. 4A and 4B. The front section 122 of the second embodiment has second grooves or gaps 122E between the pairs of anti-tilt ridges 122B connected to the first groove 122C, which is arranged on the front end surface of the code reader main body and open at the opposite sides to be located along the scanning direction. Thus, the profile of the front section of a code reader according to the invention can be selected from a variety of different feasible profiles without departing from the scope of the invention.

While the present invention is described above by ways preferred embodiments, the present invention is by no means limited to the embodiments, which may be modified or changed within the scope of the invention. The present invention will be summarily described below.

(1) A pen type code reader having an optical system and an area sensor for transforming the light focused by the optical system into an electric signal and outputting the latter and adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:
   a first groove arranged on the front surface of a front section of a code reader main body and open at the opposite ends in a scanning direction; and
   second grooves arranged longitudinally on the respective opposite external sides of the front section of the code reader main body to be located along the scanning direction; wherein
   the first groove and the second grooves are formed as parts of a continuous groove.

Thus, the code reader can easily be prevented from being tilted toward the recording medium when it is driven to scan the code pattern on the recording medium and the user can easily place the code reader in position relative to the code pattern to be read to eliminate inadvertent read errors on the part of the user.

(2) The pen type code reader as defined in (1) above, wherein the width of the first groove and that of the second grooves are equal to each other, the width of the first groove extending perpendicularly relative to the scanning direction; and
   the width of the first and second grooves is substantially equal to the width of the code pattern, the width of the code pattern extending perpendicularly relative to the scanning direction.

(3) The pen type code reader as defined in (1) above, wherein the width of the first groove and that of the second grooves are equal to each other, the width of the first groove extending perpendicularly relative to the scanning direction; and
   the width of the first and second grooves is greater than the width of the code pattern, the width of the code pattern extending perpendicularly relative to the scanning direction.

When the width, which extends perpendicularly relative to the scanning direction, of the first and second grooves are greater than the width of the code pattern to be read, the user is allowed to swing the code reader to a certain extent and hence can scan the latter with ease. Additionally, with this arrangement, the contact surface of the code reader will not scratch and damage the code pattern during the scanning operation.

(4) The pen type code reader as defined in (1), further comprising a cap to be removably engaged into the second grooves to shield at least the image pick-up opening.

With this arrangement, the cap has sections to be fitted into the respective grooves to close the opening and protect the lens of the code reader against pieces dirt that can otherwise stick to the lens when the code reader is not in use. Additionally, the cap can prevent the projections of the code reader from being deformed and damaged by external force particularly when the code reader is carried by the user.

(5) The pen type code reader as defined in (1), wherein the code pattern is realized in the form of a plurality of blocks arranged two-dimensionally side by side, each having a predetermined area adapted to contain a data portion having a predetermined volume and obtained by dividing the original data;
   each of the blocks including at least:
      a data dot pattern formed by a plurality of dots arranged in correspondence to the divided data portion;
      markers arranged with a predetermined positional relationship relative to the data dot pattern to provide reference points for reading the data dot pattern; and
      a block address pattern for identifying the block.

Thus, with such a code pattern, various data including sound data can be printed and recorded on a recording medium to maximally exploit the advantages of a code reader according to the invention.

(6) A pen type code reader having an optical system and an area sensor for transforming the light focused by the optical system into an electric signal and outputting the latter and adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:
   two pairs of substantially parallel anti-tilt ridges arranged on the respective opposite external sides of a front section of a code reader main body to be located along a scanning direction and projecting in the scanning direction, the gap separating the two anti-tilt ridges of each pair being substantially equal to the width of the code pattern, the width of the code pattern extending perpendicularly relative to the scanning direction; and
   a groove arranged on the front surface of the front section of the code reader main body and open at the opposite ends to the external sides in the scanning direction and having a width substantially equal to the width of the code pattern.

With this arrangement, the code reader can easily be prevented from being tilted toward the recording medium when it is driven to scan the code pattern on the recording medium and the user can easily place the code reader in position relative to the code pattern to be read to eliminate inadvertent read errors on the part of the user. Additionally, as a groove having a width substantially equal to that of the code reader is arranged on the open side of the code reader and running in the scanning direction, the contact surface of the code reader can be effectively prevented from scraping and damaging the code pattern in the scanning operation.

(7) The pen type code reader as defined in (6) above, wherein the front section of the code reader main body having the anti-tilt ridges is made as a member different from the remaining portion of the code reader.

Thus, the front end of the code reader is made of a material having a small coefficient of friction and different from the material of the remaining portion of the housing so that the load of the code reader can be reduced in the scanning operation and the scanning operation can be carried out with less effort. Additionally, the code pattern is further prevented from damages in the scanning operation.

(8) The pen type code reader as defined in (6) above, further comprising a cap to be removable engaged with gaps defined by the respective pairs of anti-tilt ridges to shield the image pick-up opening.

Thus, a cap to be removable engaged with gaps defined by the respective pairs of anti-tilt ridges of the code reader is provided to close the opening when fitted to the code reader so that the lens can be protected against pieces of dirt that can otherwise adhere to the lens when the code reader is not in use. Additionally, the cap can prevent the code reader from deformations and damages that can occur to the code reader by external force when the code reader is carried by the user.

(9) The pen type code reader as defined in (6) above, wherein the front section of the code reader main body shows a substantially rectangular cross section.

With this arrangement of the front section having a rectangular cross section along the opening, the internal members can be arranged to effectively utilize the internal space and downsize the code reader. Additionally, the code reader can be aligned easily with the code pattern to be read.

(10) The pen type code reader as defined in (6) above, wherein the code pattern is realized in the form of a plurality of blocks arranged two-dimensionally side by side, each having a predetermined area adapted to contain a data portion having a predetermined volume and obtained by dividing the original data;

each of the blocks including at least:
a data dot pattern formed by a plurality of dots arranged in correspondence to the divided data portion;
markers arranged with a predetermined positional relationship relative to the data dot pattern to provide reference points for reading the data dot pattern; and
a block address pattern for identifying the block.

Thus, with such a code pattern, various data including sound data can be printed and recorded on a recording medium to maximally exploit the advantages of a code reader according to the invention.

(11) A pen type code reader adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

an optical system;
an area sensor for transforming the light focused by the optical system into an electric signal and outputting the latter; and
a substantially U-shaped groove arranged on a front section of a code reader main body in such a manner that two end portions of the groove are respectively located at two external side surfaces of the front section which are confronted with a scanning direction.

With this arrangement, the code pattern is visible to the user through at least one of the end portions of the U-shaped groove when scanning the code pattern, so that the user can easily and correctly place the code reader in position relative to the code pattern being read, resulting in that inadvertent read errors on the part of the user will be eliminated.

(12) The pen type code reader as defined in (11) above, further comprising two pairs of substantially parallel anti-tilt ridges arranged on the respective opposite external sides of the front section of the code reader main body to be located along the scanning direction and projecting in the scanning direction; wherein the gap separating the two anti-tilt ridges of each pair is substantially equal to the width of the code pattern, the width of the code pattern extending perpendicularly relative to the scanning direction.

With this arrangement, the code reader can easily be prevented from being tilted toward the recording medium when it is driven to scan the code pattern on the recording medium.

(13) The pen type code reader as defined in (12) above, wherein the width of the substantially U-shaped groove is substantially equal to the width of the code pattern.

The groove have a width substantially equal to that of the code pattern on the side of the opening in the scanning direction so that the contact surface of the code reader can be effectively prevented from scraping and damaging the code pattern in the scanning operation.

(14) A pen type code reader adapted to optically read a code pattern printed on a sheet of recording medium as optically readable code pattern by holding the front surface having an image pick-up opening of the code reader in contact with the sheet of recording medium and moving it by a predetermined distance to manually scan the code pattern, the code reader comprising:

an optical system;
an area sensor for transforming the light focused by the optical system into an electric signal and outputting the latter; and
two pairs of substantially parallel anti-tilt ridges arranged on the respective opposite external sides of a front section of a code reader main body to be located along a scanning direction and projecting in the scanning direction; wherein
the gap separating the two anti-tilt ridges of each pair is substantially equal to the width of the code pattern, the width of the code pattern extending perpendicularly relative to the scanning direction.

With this arrangement, the code reader can easily be prevented from being tilted toward the recording medium when it is driven to scan the code pattern on the recording medium.

Additionally the code pattern is visible to the user through the grooves when scanning the code pattern so that the user can easily and correctly place the code reader in position relative to the code pattern being read.

(15) The pen type code reader as defined in (14) above, further comprising a substantially U-shaped groove arranged on a front section of a code reader main body in such a manner that two end portions of the groove are respectively located at two external side surfaces of the front section which are confronted with a scanning direction, the width of the groove being substantially equal to the width of the code pattern.

The groove have a width substantially equal to that of the code pattern on the side of the opening in the scanning direction so that the contact surface of the code reader can be effectively prevented from scraping and damaging the code pattern in the scanning operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code reader having an optical system for focusing light, and an area sensor for transforming the light focused by the optical system into an electrical signal and outputting the electrical signal, said code reader being adapted to optically read a code pattern printed on a sheet of recording medium as an optically readable code pattern through an image pick-up opening provided in a front section of a main body of the code reader placed in contact with the sheet of recording medium and moving the code reader a predetermined distance in a scanning direction to manually scan the code pattern, said code reader comprising:

a first groove arranged on a front surface of the front section of the main body of the code reader, said first groove being open at opposite ends located along said scanning direction; and second grooves respectively defined outwardly on opposite external sides of the front section of the main body of the code reader such that said second grooves are located along the scanning direction;

wherein said first groove and said second grooves are formed as parts of a continuous groove;

two pairs of anti-tilt ridges interposing the first and second grooves therebetween and projecting in the scanning direction, in order to prevent the code reader from tilting while the code reader is being moved on the recording medium in the scanning direction to manually scan the code pattern; and wherein said code reader is substantially pen-shaped.

2. The code reader according to claim 1, wherein:

a width of said first groove and a width of said second grooves are equal to each other, said width of said first groove extending perpendicularly relative to the scanning direction; and the equal width of said first and second grooves is substantially equal to a width of the code pattern, said width of the code pattern extending perpendicularly relative to the scanning direction.

3. The code reader according to claim 1, wherein:

a width of said first groove and a width of said second grooves are equal to each other, said width of said first groove extending perpendicularly relative to the scanning direction; and the equal width of said first and second grooves is greater than a width of the code pattern, said width of the code pattern extending perpendicularly relative to the scanning direction.

4. The code reader according to claim 1, further comprising a cap to be removably engaged into the second grooves to shield at least the image pick-up opening of the code reader.

5. The code reader according to claim 1, wherein:

said code pattern comprises a plurality of blocks arranged two-dimensionally side by side, each having a predetermined area adapted to contain a data portion having a predetermined volume and obtained by dividing original data; and each of said blocks includes at least:
(i) a data dot pattern formed by a plurality of dots arranged in correspondence to said data portion; (ii) markers arranged with a predetermined positional relationship relative to the data dot pattern to provide reference points for reading the data dot pattern; and
(iii) a block address pattern for identifying the block.

6. A code reader having an optical system for focusing light, and an area sensor for transforming the light focused by the optical system into an electric signal and outputting the electrical signal, said code reader being adapted to optically read a code pattern printed on a sheet of recording medium as an optically readable code pattern through an image pick-up opening provided in a front section of a main body of the code reader placed in contact with the sheet of recording medium and moving the code reader a predetermined distance in a scanning direction to manually scan the code pattern, said code reader comprising:

two pairs of substantially parallel anti-tilt ridges arranged on respective opposite external sides of the front section of the main body of the code reader to be located along said scanning direction and projecting in the scanning direction, in order to prevent the code reader from tilting while the code reader is being moved on the recording medium in the scanning direction, wherein a gap separating the two anti-tilt ridges of each pair is substantially equal to a width of the code pattern, and said width of the code pattern extends perpendicularly relative to the scanning direction;

a groove arranged on a front surface of the front section of the main body of the code reader, said groove being open at opposite ends to said respective opposite external sides in the scanning direction and having a width substantially equal to the width of the code pattern; and wherein said code reader is substantially pen-shaped.

7. The code reader according to claim 6, wherein the front section of the main body of the code reader having said anti-tilt ridges comprises a member which is different from a remaining portion of the code reader.

8. The code reader according to claim 6, further comprising a cap to be removable engaged with the gaps defined by the two pairs of anti-tilt ridges to shield said image pick-up opening of the code reader.

9. The code reader according to claim 6, wherein the front section of said main body of the code reader has a substantially rectangular cross section.

10. The code reader according to claim 6, wherein:

said code pattern comprises a plurality of blocks arranged two-dimensionally side by side, each having a predetermined area adapted to contain a data portion having a predetermined volume and obtained by dividing original data; and each of said blocks includes at least:
(i) a data dot pattern formed by a plurality of dots arranged in correspondence to said [divided] data portion; (ii) markers arranged with a predetermined positional relationship relative to the data dot pattern to provide reference points for reading the data dot pattern; and (iii) a block address pattern for identifying the block.

11. A code reader adapted to optically read a code pattern printed on a sheet of recording medium as an optically readable code pattern through an image pick-up opening provided in a front section of a main body of the code reader placed in contact with the sheet of recording medium and moving the code reader a predetermined distance in a scanning direction to manually scan the code pattern, said code reader comprising:

an optical system for focusing light;

an area sensor for transforming the light focused by said optical system into an electric signal and outputting the electrical signal;

two pairs of substantially parallel anti-tilt ridges arranged on respective opposite external sides of the front section of the main body of the code reader to be located along said scanning direction and projecting in the scanning direction, in order to prevent the code reader from tilting while the code reader is being moved on the recording medium in the scanning direction;

wherein a gap separating the two anti-tilt ridges of each pair is substantially equal to a width of the code pattern, and the width of the code pattern extends perpendicularly relative to the scanning direction; and wherein said code reader is substantially pen-shaped.

12. The code reader according to claim 11, further comprising a substantially U-shaped groove arranged on the front section of the main body of the code reader in such manner that two end portions of the groove are respectively located at the respective opposite external sides of the front section which are confronted with the scanning direction, and wherein a width of said groove is substantially equal to the width of said code pattern.

* * * * *

UNITED STATES PATENT AND TRADEMARK OFFICE
CERTIFICATE OF CORRECTION

PATENT NO.     : 6,305,608 B1
DATED          : October 23, 2001
INVENTOR(S)    : Yoshiyuki Nada It is certified that error appears in the above-identified patent and that said Letters Patent is hereby corrected as shown below:

<u>Title page,</u>
Item [45], Date of Patent, before "Oct. 23, 2001", insert -- * --; and
Item [*] Notice, before "Subject to any disclaimer...", insert
-- This patent issued on a continuation
   prosecution application filed under
   37 CFR 1.53(d), and is subject to the
   twenty year patent term provisions of
   35 U.S.C. 1.54(a) (2). --.

Signed and Sealed this

Twenty-sixth Day of August, 2003

JAMES E. ROGAN
*Director of the United States Patent and Trademark Office*